United States Patent [19]
Garzon

[11] Patent Number: 6,141,192
[45] Date of Patent: *Oct. 31, 2000

[54] ARCING FAULT PROTECTION SYSTEM FOR A SWITCHGEAR ENCLOSURE

[75] Inventor: Ruben D. Garzon, Brentwood, Tenn.

[73] Assignee: Square D Company, Palatine, Ill.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/190,094

[22] Filed: Nov. 12, 1998

Related U.S. Application Data

[63] Continuation-in-part of application No. 08/974,254, Nov. 19, 1997, Pat. No. 5,933,308.

[51] Int. Cl.[7] ........................................ H02H 3/00
[52] U.S. Cl. ................................. 361/5; 361/62
[58] Field of Search .................. 361/2, 3, 8, 9, 361/13, 102, 54, 119, 118, 124, 131; 218/43, 45, 91

[56] References Cited

U.S. PATENT DOCUMENTS

| | | | |
|---|---|---|---|
| 2,971,130 | 2/1961 | Diebold | 317/16 |
| 3,660,721 | 5/1972 | Baird | 361/55 |
| 3,716,757 | 2/1973 | Rodriguez | 317/40 |
| 3,868,549 | 2/1975 | Schaefer et al. | 317/11 E |
| 3,932,790 | 1/1976 | Muchnick | 317/18 D |
| 4,130,850 | 12/1978 | Cronin et al. | 361/54 |
| 4,156,846 | 5/1979 | Harrold et al. | 324/158 |
| 4,166,260 | 8/1979 | Gillette | 335/20 |
| 4,295,021 | 10/1981 | Asinovsky et al. | |
| 4,344,100 | 8/1982 | Davidson et al. | 361/45 |
| 4,347,414 | 8/1982 | Headley et al. | |
| 4,355,220 | 10/1982 | Parry | |
| 4,369,364 | 1/1983 | Kuntermann | |
| 4,378,525 | 3/1983 | Burdick | 324/127 |
| 4,477,855 | 10/1984 | Nakayama et al. | 361/54 |
| 4,539,448 | 9/1985 | Schulz | |
| 4,587,588 | 5/1986 | Goldstein | 361/54 |
| 4,631,621 | 12/1986 | Howell | 361/13 |
| 4,697,055 | 9/1987 | Walter et al. | |
| 4,723,187 | 2/1988 | Howell | 361/13 |
| 4,816,958 | 3/1989 | Belbel et al. | 361/93 |
| 4,835,648 | 5/1989 | Yamauchi | |
| 4,847,719 | 7/1989 | Cook et al. | 361/13 |
| 4,878,144 | 10/1989 | Nebon | 361/96 |
| 4,901,183 | 2/1990 | Lee | 361/56 |
| 5,136,451 | 8/1992 | Valdemarsson et al. | 361/2 |
| 5,257,157 | 10/1993 | Epstein | 361/111 |
| 5,373,241 | 12/1994 | Ham, Jr. et al. | 324/536 |

(List continued on next page.)

FOREIGN PATENT DOCUMENTS 0158365  6/1989  Japan .

OTHER PUBLICATIONS

"IEEE Standard for Metal Enclosed Interrupter Switchgear," An American National Standard (Institute of Electrical and Elecronics Engineers, Inc.), pp. 9–12. (Date Unknown).

"IEEE Standard for Metal Clad and Station–Type Cubicle Switchgear," An American National Standard (Institute of Electrical and Electronics Engineers, Inc.), pp. 11–16. (Date Unknown).

Primary Examiner—Josie Ballato
Assistant Examiner—Kim Huynh
Attorney, Agent, or Firm—Kareem M. Irfan; Larry I. Golden

[57] ABSTRACT

An arcing fault protection system for a switchgear enclosure includes a switching device for rapidly diverting current from the source bus of an electrical distribution system in response to the detection of arcing faults in the system. The switching device, which may comprise a mechanical switch, a solid-state switch or hybrid device, quickly diverts current carried on the source bus to effectively extinguish arcing fault currents present in the distribution system, preventing the generation of gases at high pressures and/or temperatures so as to protect the switchgear equipment from damage.

18 Claims, 6 Drawing Sheets

U.S. PATENT DOCUMENTS

| | | | |
|---|---|---|---|
| 5,388,021 | 2/1995 | Stahl | 361/56 |
| 5,459,630 | 10/1995 | MacKenzie et al. | 361/45 |
| 5,473,494 | 12/1995 | Kurosawa et al. | 361/3 |
| 5,499,189 | 3/1996 | Seitz | 364/480 |
| 5,574,624 | 11/1996 | Rennie et al. . | |
| 5,590,010 | 12/1996 | Ceola et al. | 361/93 |
| 5,617,019 | 4/1997 | Etter | 324/117 |
| 5,638,244 | 6/1997 | Mekanik et al. | 361/62 |
| 5,661,645 | 8/1997 | Hochstein | 363/89 |
| 5,764,125 | 6/1998 | May | 336/92 |
| 5,825,598 | 10/1998 | Dickens et al. | 361/42 |
| 5,834,940 | 11/1998 | Brooks et al. | 324/424 |
| 5,835,319 | 10/1998 | Welles, II et al. | 361/5 |
| 5,835,321 | 10/1998 | Elms et al. | 361/45 |
| 5,839,092 | 11/1998 | Erger et al. | 702/58 |
| 5,847,913 | 12/1998 | Turner et al. | 361/93 |
| 5,886,861 | 3/1999 | Parry | 361/42 |
| 5,889,643 | 3/1999 | Elms | 361/42 |
| 5,896,262 | 4/1999 | Rae et al. | 361/94 |
| 5,905,619 | 5/1999 | Jha | 361/93 |
| 5,933,308 | 8/1999 | Garzon | 361/62 |
| 5,946,179 | 8/1999 | Fleege et al. | 361/93 |

# ARCING FAULT PROTECTION SYSTEM FOR A SWITCHGEAR ENCLOSURE

CROSS-REFERENCE TO RELATED APPLICATION

This is a continuation-in-part of prior application Ser. No. 08/974,254 filed Nov. 19, 1997, now U.S. Pat. No. 5,933,308.

FIELD OF THE INVENTION

The present invention relates generally to protective devices for electrical switchgear and, more particularly, to the protection of electrical switchgear from arcing fault currents.

BACKGROUND OF THE INVENTION

Switchgear enclosures are commonly employed in electrical power distribution systems for enclosing circuit breakers and switching equipment associated with the distribution system. Typically, switchgear enclosures are comprised of a number of individual stacked or adjacent compartments, each of the switchgear compartments receiving electrical power from a power source and distributing the electrical power through a feeder circuit to one or more loads. Generally, each of the switchgear compartments includes circuit breakers for interrupting electric power in a particular feeder circuit in response to hazardous current overloads in the circuit.

Switchgear is a general term covering switching and interrupting devices and their combination with associated control, instruments, metering, protective and regulating devices, also assemblies of these devices with associated interconnections, accessories, and supporting structures used primarily in connection with the generation, transmission, distribution, and conversion of electric power. The following paragraphs describe switchgear characteristics in accordance with ANSI/IEEE Standards No. C37.20.2-1987.

A switchgear assembly generally refers to assembled equipment (indoor or outdoor) including, but not limited to, one or more of the following: switching, interrupting, control, instrumentation, metering, protective and regulating devices, together with their supporting structures, enclosures, conductors, electrical interconnections, and accessories. A switchgear assembly may be completely enclosed on all sides and top with sheet metal (except for ventilating openings and inspection windows) containing primary power circuit switching or interrupting devices, or both, with buses and connections referred to as metal-enclosed (ME) power switchgear. The assembly may include control and auxiliary devices. Access to the interior of the enclosure is usually provided by doors or removable covers, or both.

Metal-enclosed power switchgear may include one or more of the following features:

(1) The main switching and interrupting device is of the removable (drawout) type arranged with a mechanism for moving it physically between connected and disconnected positions and equipped with self-aligning and self-coupling primary disconnecting devices and disconnectable control wiring connections.

(2) Major parts of the primary circuit, that is, the circuit switching or interrupting devices, buses, voltage transformers, and control power transformers, are completely enclosed by grounded metal barriers, that have no intentional openings between compartments. Specifically included is a metal barrier in front of or a part of the circuit interrupting device to ensure that, when in the connected position, no primary circuit components are exposed by the opening of a door.

(3) All live parts are enclosed within grounded metal compartments.

(4) Automatic shutters that cover primary circuit elements when the removable element is in the disconnected, test, or removed position.

(5) Primary bus conductors and connections are covered with insulating material throughout.

(6) Mechanical interlocks are provided for proper operating sequence under normal operating conditions.

(7) Instruments, meters, relays, secondary control devices and their wiring are isolated by grounded metal barriers from all primary circuit elements with the exception of short lengths of wire such as at instrument transformers terminals.

(8) The door through which the circuit interrupting device is inserted into the housing may serve as an instrument or relay panel and may also provide access to a secondary or control compartment within the housing.

Switchgear leaving all of the above eight features is referred to as metal-clad (MC) Switchgear. Metal-clad switchgear is metal-enclosed, but not all metal-enclosed switchgear is metal-clad.

The ratings of a switchgear assembly are designations of operating limits under specified conditions of ambient temperature, temperature rise, etc. Where the switchgear assembly comprises a combination of primary and secondary circuits, each may be given ratings.

ME switchgear usually has the following ratings:
(1) Rated maximum voltage
(2) Rated frequency
(3) Rated insulation levels
(4) Rated continuous current
(5) Rated short-time current
(6) Rated momentary current The designated ratings in this standard are preferred but are not considered to be restrictive.

In addition to these ratings, a switchgear assembly may have interrupting or switching capabilities, which are determined by the rating of the particular interrupting and switching devices that are integral parts of the switchgear assembly.

The rated maximum voltage of ME switchgear is the highest arms voltage for which the equipment is designed, and is the upper limit for operation.

The rated insulation levels of ME switchgear includes two items.
(1) Low frequency 1 min withstand voltage
(2) Impulse withstand voltage The rated maximum voltages, and corresponding insulation levels for ME switchgear are listed in tabular form in ANSI/IEEE C37.30.2-1987.

The rated frequency of a device, or an assembly, is the frequency of the circuit for which it is designed. (Ratings are usually based on a frequency of 60 Hz).

The rated continuous current of ME switchgear is the maximum current in arms amperes at rated frequency, which can be carried continuously by the primary circuit components, including buses and connections, without causing temperatures in excess of specified limits for (1) Any primary or secondary circuit component (2) Any insulating medium, or structural or enclosing member The specified temperature limits applicable to switchgear assemblies are given in ANSI/IEEE C37.20.2-1987, §§4.5.1 through 4.5.6.

The continuous current ratings of the main bus in ME switchgear are listed in ANSI/IEEG C37.20.2-1987.

The continuous current rating of the individual circuit-breaker compartment shall be equal to the ratings of the switching and interrupting devices used, except as may be modified by lower continuous current ratings for current transformers, power fuses etc.

The rated momentary current of ME switchgear is the maximum arms total current that it shall be required to withstand. The current shall be the arms value, including the direct-current component, at the major peak of the maximum cycle as determined from the envelope of the current wave during a test period of at lease 10 cycles unless limited to a shorter time by the protective device.

The momentary current ratings of the individual circuit-breaker compartments of ME switchgear shall be equal to: The circuit breaker close and latch, switch fault close, or asymmetrical momentary current ratings of the switching devices used.

The rated short-time current of the ME switchgear is the average arms current that it can carry for a period of 2 sec. unless limited to a shorter time by the protective device or current transformer ratings.

The short-time current ratings of the individual circuit-breaker compartments of the ME switchgear shall be equal to the short-time ratings of the switching and protective devices used or the short time rating of the current transformers (see ANSI/IEEE C57. 13-1978 (R 1986) [10]).

The limiting temperature for ME switchgear is the maximum temperature permitted.

In addition to current overloads, the switchgear enclosure may encounter other hazardous conditions known as arcing faults. Arcing faults occur when electric current "arcs" or flows through ionized gas between conductors, between two ends of broken or damaged conductors, or between a conductor and ground in the switchgear enclosure. Arcing faults typically result from corroded, worn or aged wiring or insulation, loose connections and electrical stress caused by repeated overloading, lightning strikes, etc. Particularly in medium- to high-voltage power distribution systems, the ionized gas associated with arcing faults may be released at pressures and temperatures sufficient to damage the switchgear equipment.

Presently, the most commonly employed method for enhancing the durability of switchgear enclosures in the event of arcing faults is to provide arc-resistant metal switchgear compartments to the above-described MC (metal clad) standards, with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. However, because these systems do not eliminate the generation and release of hot gases associated with arcing faults, they do not eliminate the risk of damage to the switchgear equipment.

Cronin, U.S. Pat. No. 4,130,850 is directed to a high speed fault diverter switch for a gas-insulated substation. However, the switch referred by Cronin is a High Voltage switch which would be used in a GIS (Gas Insulated Substation). The lowest typical voltage application for this type of system would be at 60–145 kV which requires an impulse voltage level of up to 650 kV. For this application and in order to withstand the high voltage, the open gap of the contacts would be typically around 4 inches. However, Cronin discloses only a conventional switch, which would require 3 to 4 cycles (i.e., 48–64 in sec.) to operate. Cronin speaks of the rise of the high pressure being extremely rapid; indeed, experience has shown that the arc should be controlled within 4 milliseconds.

Therefore, the conventional switch will not work, because the contacts must travel 4 inches in 4 milliseconds which gives an approximate average velocity of 25 meters per second. Since, the acceleration time is 4 ms. and the initial velocity is 0 then the required constant acceleration is about 12,500 meter second squared.

And when the mass of the contact and the drive system is taken into consideration (assume a typical mass of 6 kg) the required force is 75 kilo-newtons which for the required 4 inch or about 100 mm stroke gives an energy requirement of 7.5 kilo-newton-meter. Presently available switch mechanisms are incapable of fulfilling this requirement, in fact, they are at least one order of magnitude short of this level of energy. Therefore, Cronin presents a problem without a practical solution. That is, the switch required by Cronin does not exist.

The use of the electrodynamic drive would not be feasible either because the discharge pulse is generally in the order of 1 to 2 milliseconds. For example, the discharge pulse described in Diebold U.S. Pat. No. 2,971,130, is a 1 millisecond pulse. With a 1 ms pulse discharge and assuming that the transfer efficiency of the system is 20% at best, the components required can be estimated. Energy from the capacitor is $E^2C$=30,000 newton-meters. A reasonable voltage to charge the capacitor would be 3,000 volts in which case a capacitor of 0.0033 farads is needed (this is a rather large capacitor) or if a more common capacitor of 100 micro-farads is used then the charging voltage would be 300 kV.

Accordingly, there is a need for a system of protecting switchgear enclosures and from arcing faults in a manner which is very rapid and reduces or eliminates the generation of ionized gases at high temperatures and pressures. The present invention is directed to addressing this need.

SUMMARY OF THE INVENTION

In one embodiment of the present invention, there is provided an arcing fault protection system for a switchgear enclosure accommodating a plurality of feeder circuits. Each of the feeder circuits is electrically connected to a source bus and carries an electric current through the switchgear enclosure toward one or more loads downstream of the switchgear enclosure. The arcing fault protection system comprises one or more arcing fault detectors for monitoring the feeder circuits for the presence of arcing fault currents and for producing an arcing fault detection signal upon detecting arcing fault currents in any of the feeder circuits, and an arc diverting device for rapidly diverting the current from the source bus in response to the production of an arcing fault detection signal. The arc diverting device diverts current carried on the source bus to ground, or to another phase in an ungrounded three phase system, and rapidly eliminates arcing fault currents occurring on any of the feeder circuits. The rapid elimination of arcing fault currents substantially reduces or eliminates the generation of hot gases associated with arcing faults and obviates the need to provide an arc-resistant switchgear enclosure or to vent gases from the enclosure.

In another embodiment of the present invention, the arc diverting device comprises a mechanical switch rapidly movable from an open position to a closed position. The mechanical switch includes a movable contact and a stationary contact. One of the contacts is electrically connected to the source bus and the other of the contacts is electrically connected to ground or to another phase in a three phase ungrounded system. In the open position of the mechanical switch, the movable contact is in a first longitudinal position, apart from the stationary contact. In the closed position of the mechanical switch, the movable contact is in a second longitudinal position, electrically connected to the stationary contact. A latching mechanism comprises a portion of the mechanical switch. The latching mechanism holds the movable contact in the first longitudinal position, defining a latched position, or releases the movable contact from the first longitudinal position, defining an unlatched position, depending on the status of the mechanical switch. A driving mechanism rapidly drives the latching mechanism from the latched position to the unlatched position and accelerates the movable contact toward the second longitudinal position in response to activation of a triggering mechanism.

In one embodiment of the present invention, the latching mechanism includes a latch core oriented adjacent to the driving mechanism, the latch core being movable coincident to the driving mechanism and communicating movement to the movable contact in response to activation of the triggering mechanism. An outer surface of the latch core defines a holding surface and a recessed releasing surface. A stationary latch support is oriented transverse to the latch core and has an inner surface defining a retaining member. A plurality of ball bearings are disposed between the latch core and the latch support. The ball bearings are held into engagement with the retaining member by the holding surface of the latch core when the latching mechanism is in the latched position, and collapse inwardly toward the releasing surface and become released from the retaining member when the latching mechanism is in the unlatched position.

In still another embodiment of the present invention, the arc diverting device comprises a first and second thyristor connected from the source bus to ground. The first and second thyristors include respective first and second gate terminals responsive to the arcing fault detection signal. The first and second thyristors block current flow when the arcing fault detection signal is not applied to their respective gate terminals and permit current flow when the arcing fault detection signal is applied to their respective gate terminals.

BRIEF DESCRIPTION OF THE DRAWINGS

In the drawings, which comprise a portion of this disclosure.

DETAILED DESCRIPTION

Figure 1:
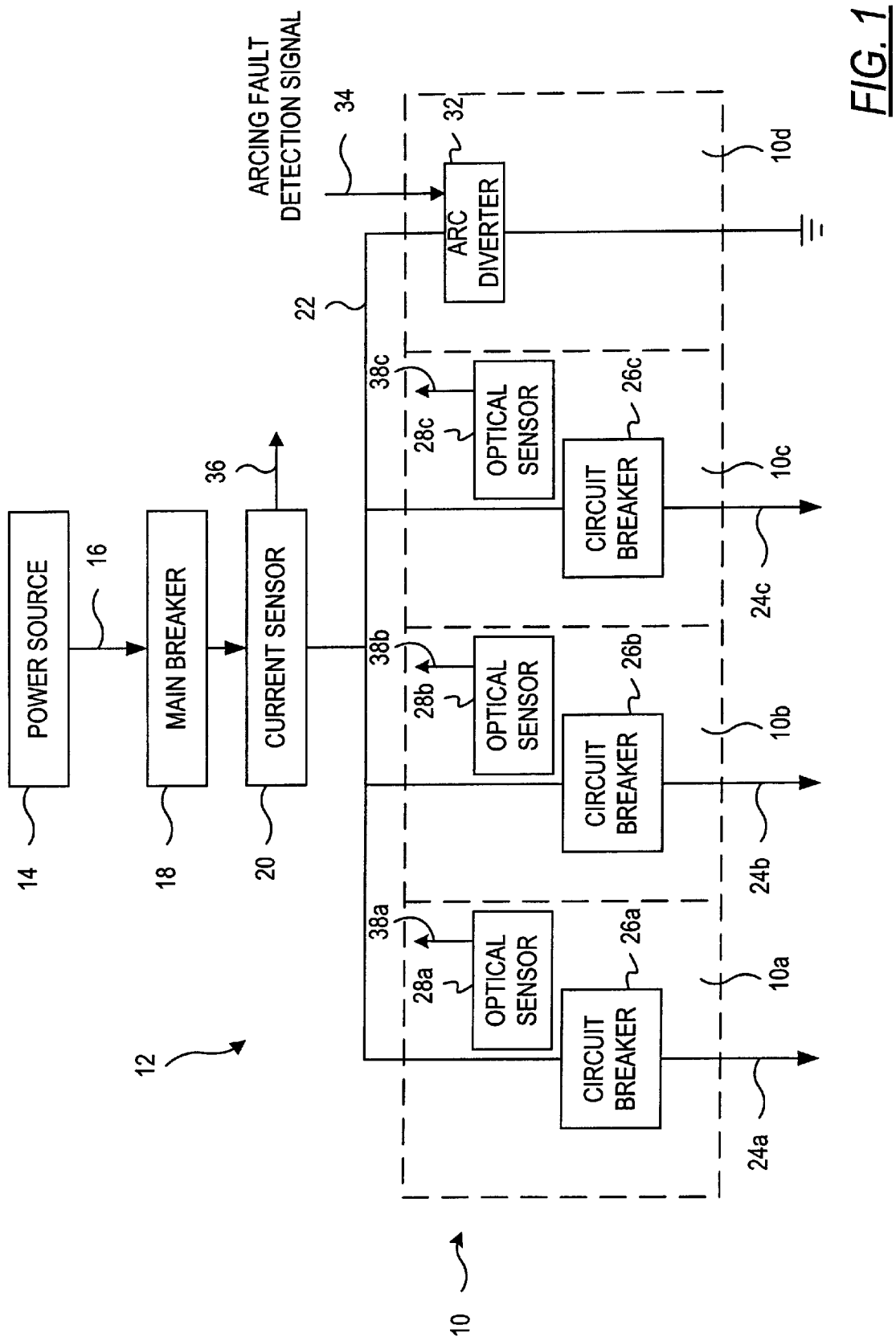
FIG. 1 is a block diagram of an arcing fault protection system for a switchgear enclosure according to one embodiment of the present invention.

Turning now to the drawings and referring first to FIG. 1, there is shown a switchgear enclosure, generally designated by reference numeral 10, including individual compartments 10a, 10b, 10c and 10d for housing various components of an electrical distribution system 12. A power source 14, which may comprise, for example, a utility company power transformer, supplies power for the distribution system 12 through a main circuit 16. The main circuit 16 is typically routed through a main breaker, designated here by reference numeral 18. An instantaneous current (or voltage) sensor 20 such as a current transformer (C.T.) may also be provided for monitoring the main circuit 16 for characteristics of arcing faults. A source bus 22 connected to main circuit 16 distributes electrical power from the power source 14 to a plurality of feeder circuits 24a, 24b, 24c, each of which is routed through one of the switchgear compartments 10. Each of the feeder circuits 24 typically supplies power to one or more loads (not shown) downstream of the switchgear enclosure 10. It will be appreciated that the number of feeder circuits 24 shown here, as well as the number of switchgear compartments 10, is exemplary only, and may be varied according to the particular type and/or application of the switchgear enclosure 10.

The switchgear enclosure 10 typically includes switching and monitoring equipment associated with the respective feeder circuits 24. For example, in the embodiment shown in FIG. 1, the switchgear enclosure 10 includes a plurality of circuit breakers 26a,b,c and a plurality of optical sensors 28a,b,c. In one embodiment, the circuit breakers 26 and optical sensors 28 comprise devices known in the art which are mounted within the respective switchgear compartments 10a,b,c and are associated with one of the feeder circuits 24a,b,c. The circuit breakers 26 are provided for interrupting electric power in the respective feeder circuits 24 in response to current overloads and the optical sensors are provided for monitoring the respective feeder circuits 24 for the presence of arcing faults. Again, however, it will be appreciated that the electrical components shown here are exemplary only; they may be replaced, eliminated or supplemented with other components, according to the particular type and/or application of the switchgear enclosure.

Figure 6:
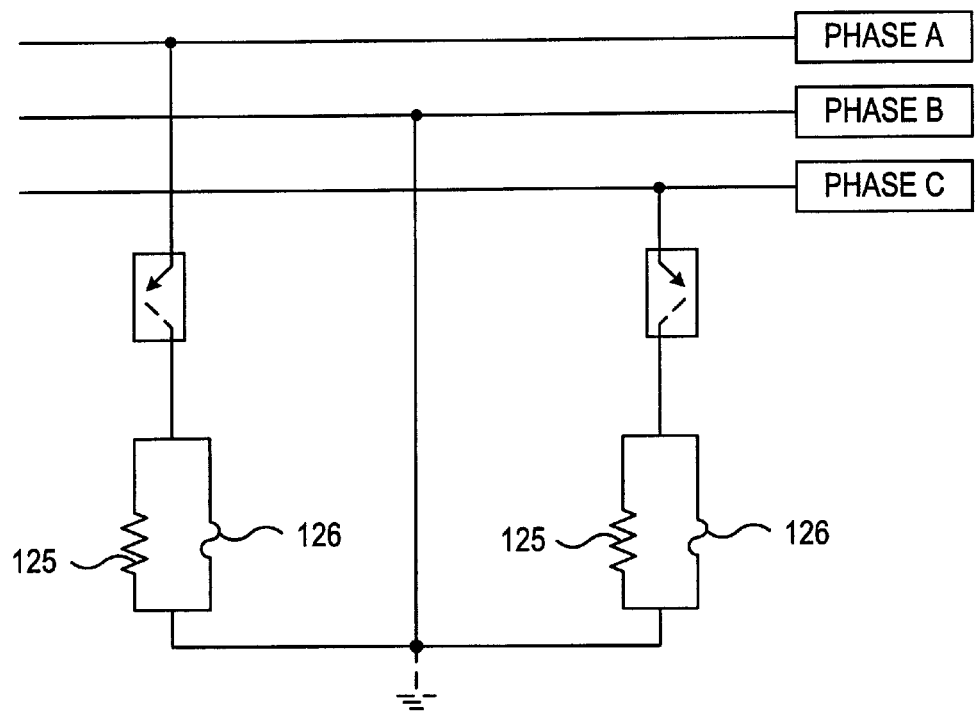
FIG. 6 is a schematic diagram of an additional circuit which may be added to the mechanical switch of FIGS. 3 and 4 or the solid state switches of FIGS. 5a–5d.

In accordance with one aspect of the present invention, an arc diverter 32 is connected between the source bus 22 and ground. In the case of an ungrounded (i.e. "delta") system (as shown in FIG. 6), the arc diverter 32 is connected between the phase lines of the system. The arc diverter 32, upon receipt of an arcing fault detection signal 34, quickly connects or "crow-bars" the source bus 22 to ground (or to another phase line in an ungrounded system), thereby extinguishing arcing fault currents which may have occurred on any of the feeder circuits 24 before they are permitted to generate gases at dangerous pressures and/or temperatures. In one embodiment, for example, the arcing fault currents are extinguished in less than about 4 milliseconds, effectively eliminating the generation of dangerous gases associated with the arcing fault. The present invention therefore can eliminate the need to manufacture the switchgear enclosure 10 according to conventional metal-clad (MC) arc-resistant designs or to vent gases from the enclosure 10.

As will be described in greater detail hereinafter, the arc diverter 32 may comprise a mechanical switch, a solid-state switch or a hybrid mechanical and solid-state switch. The arc diverter 32 may be mounted in one of the switchgear compartments, as shown here, or may be mounted in a separate compartment external to the switchgear enclosure 10.

Figure 2:
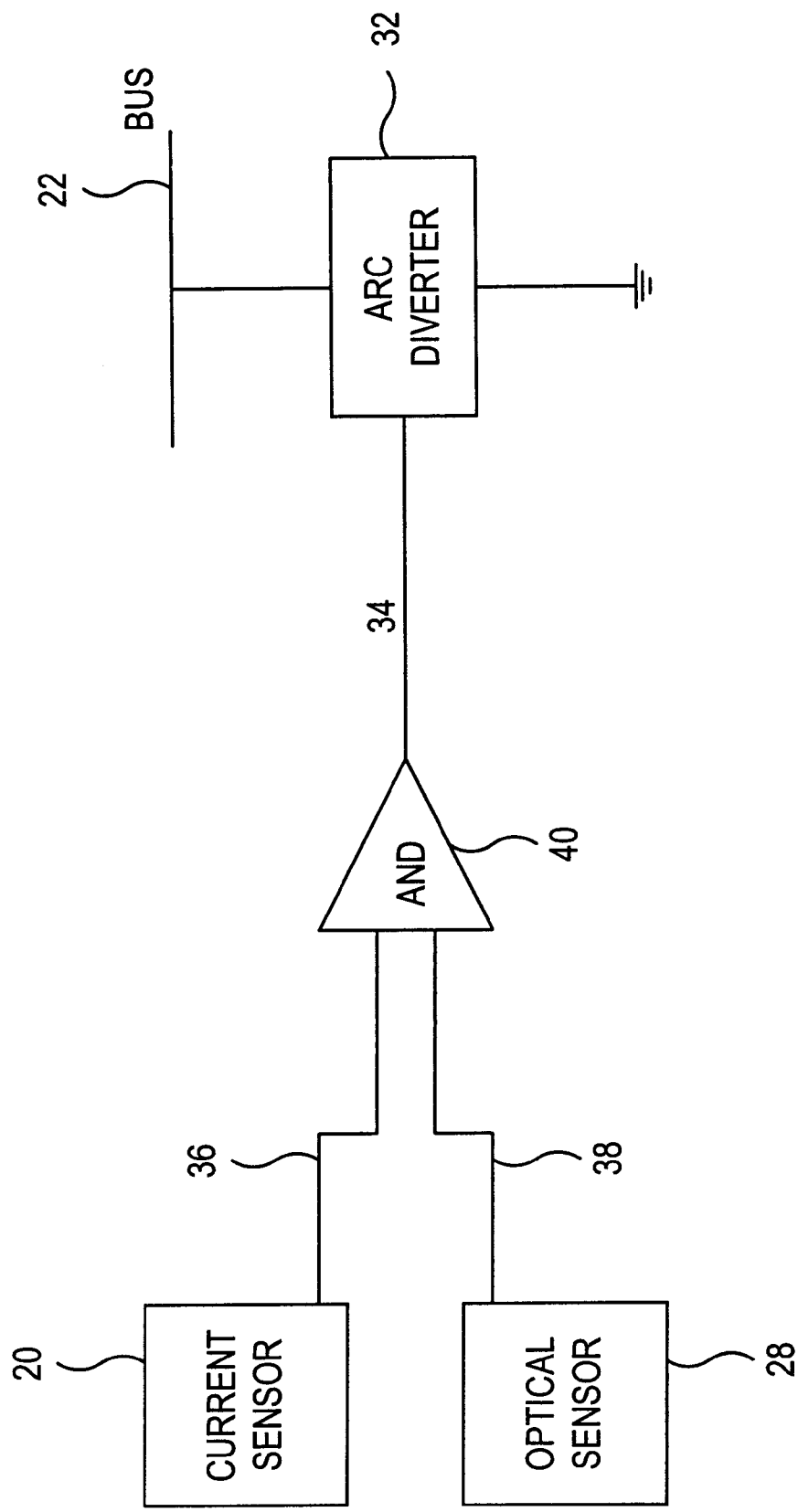
FIG. 2 is a block diagram illustrating one embodiment of a portion of the circuit of FIG. 1 which generates an arcing fault detection signal.

FIG. 2 illustrates one embodiment in which the arcing fault detection signal 34 is generated by a combination of a current sensor 20 monitoring the main circuit 16, and optical sensors 28 monitoring the feeder circuits 24. It will be appreciated, however, that the arcing fault detection signal 34 may be generated by any of several other configurations of sensors including, for example, a system where optical sensors 28 and current sensors 20 are employed in each feeder circuit 24, or a system including only optical sensors or only current sensors.

The sensor 20 comprises an instantaneous current (or voltage) sensor, such as a current transformer (C.T.), for sensing the instantaneous magnitude of the current (or voltage) in the monitored line. The sensor 20 produces an arcing fault detection signal, designated in FIG. 2 by reference numeral 36, if it determines that an arcing fault is present on the main circuit 16 or a feeder circuit 24.

The optical sensors 28 may comprise any type of optical sensor known in the art such as, for example, the optical sensor described in U.S. Pat. No. 4,369,364 and commercially available from BBC Brown, Boveri & Company Limited, Baden, Switzerland. The optical sensors 28 are sensitive to light impulses representing the occurrence of arcing faults within the switchgear enclosure 10 and produce an arcing fault detection signal, designated in FIG. 2 by reference numeral 38, if they determine that an arcing fault is present on any of the feeder circuits 24.

In one embodiment, as shown in FIG. 2, the respective arcing fault detection signals 36,38 are fed to an AND gate 40, which produces a consolidated arcing fault detection signal 34 to trigger arc diverter 32 only when arcing fault detection signals are provided by both the current sensor 20 and optical sensor 28. This arrangement minimizes the chance that switching will occur due to "false" signals because it is unlikely that false signals will be detected by both the current sensor 20 and the optical sensor 28.

In one embodiment of the present invention, the arc diverter 32 in the system of FIG. 1 comprises a mechanical switch for rapidly shorting or "crow-barring" the source bus 22 to ground in response to the receipt of an arcing fault detection signal 34. One portion of the mechanical switch may consist of a standard, commercially available vacuum interrupter 52, also known as a "vacuum bottle," such as the one shown in FIG. 3. The vacuum interrupter 52 is oriented generally about a longitudinal axis 65 and comprises a cylindrical chamber 54 for housing a movable contact 56 and a stationary contact 58. Alternatively or additionally, the vacuum interrupter 52 may include a set of contacts immersed in an insulating medium such as, but not limited to, sulfurhexaflouride gas ($SF_6$) or oil.

Figure 3:
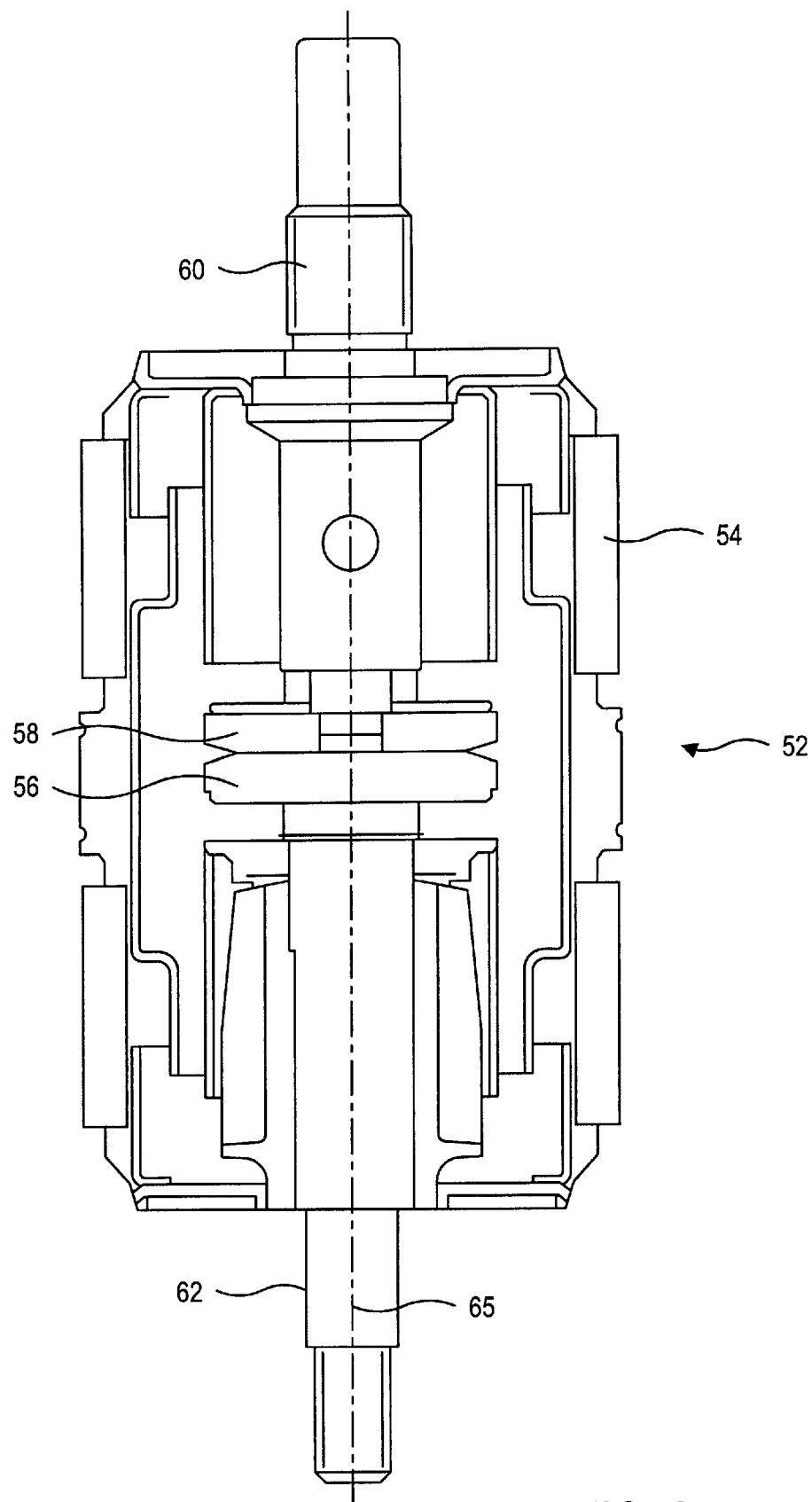
FIG. 3 is a side sectional view of a prior art vacuum interrupter which forms a portion of a mechanical switch which may form part of the arc diverter in the system of FIG. 1.
Figure 4:
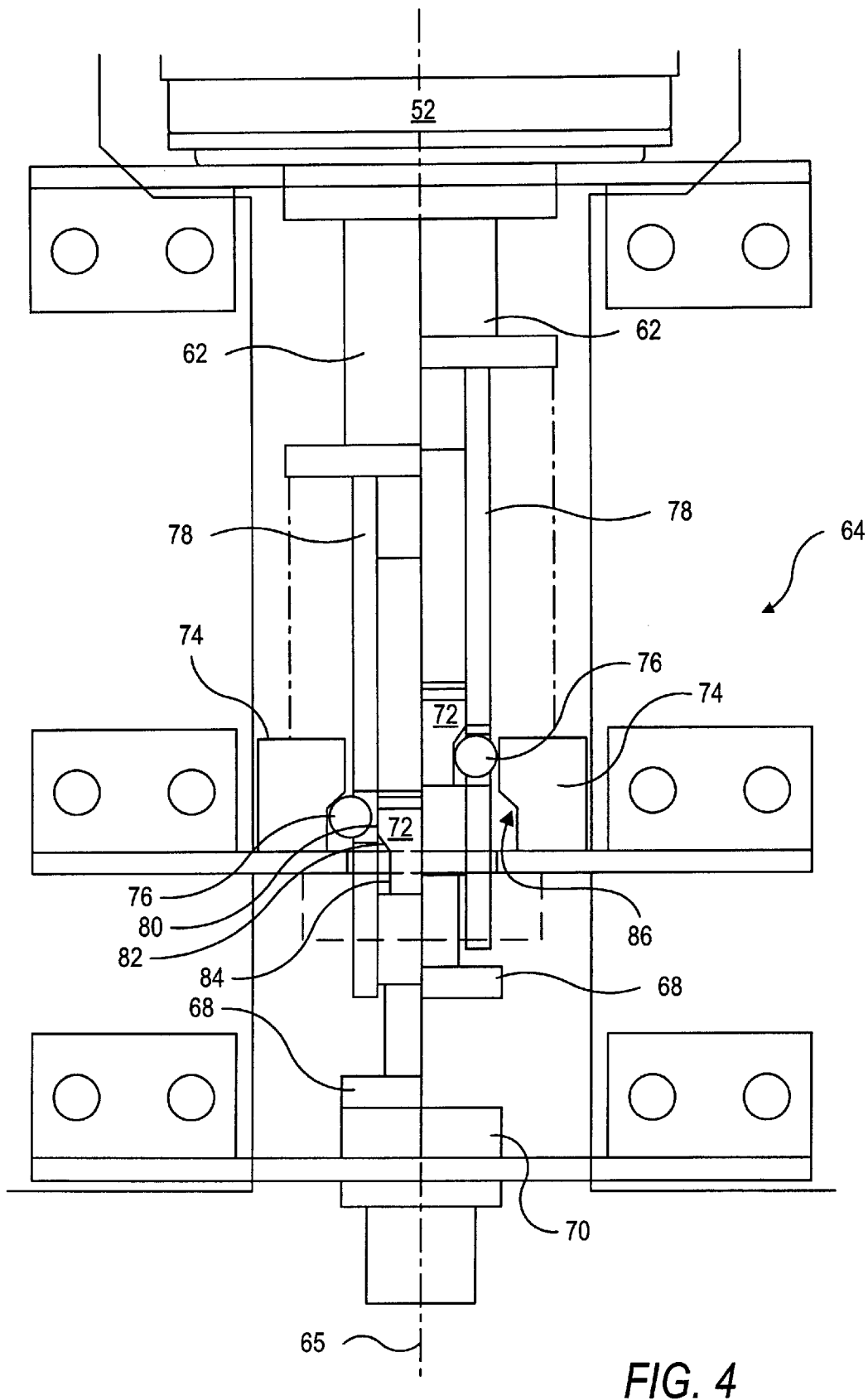
FIG. 4 is a side sectional view of another portion of a mechanical switch which may be used in conjunction with the vacuum interrupter of FIG. 3, illustrating both an open and closed position of the mechanical switch.

The stationary contact 58 is electrically connected to the source bus 22 (FIG. 1) by a connecting rod 60. The movable contact 56 is connected via a connecting rod 62 to a driving mechanism, one example of which will be described in detail later, and is shown in FIG. 4. Normally, in the absence of an arcing fault detection signal, the movable and stationary contacts 56, 58 are separated, defining an open position of the vacuum interrupter 52. In one embodiment, the separation or gap between the artifacts 56, 58 when in the open position is from about 6 mm to about 10 mm, for example, about 8 mm. As shown in FIG. 3, the movable and stationary contacts 56, 58 are engaged, defining a closed position of the mechanical switch.

According to one aspect of the present invention, the closing of the vacuum interrupter 52, e.g., the movement from the open position to the closed position, is accomplished very rapidly so as to substantially eliminate the generation of gases associated with arcing faults. More specifically, the movable contact 56 is rapidly moved toward the stationary contact 58, from a first longitudinal position in which the movable contact 56 is separated from the stationary contact 58 (i.e., in the open position of the vacuum interrupter 52), to a second longitudinal position in which the movable contact 56 is engaged with and electrically connected to the stationary contact 58 (i.e., in the closed position of the vacuum interrupter 52, which is shown in FIG. 3). Preferably, the closing of the switch is accomplished in less than about 4 milliseconds.

FIG. 4 illustrates a structure, designated by reference numeral 64, that may be used to drive the movable contact 56 into engagement with stationary contact 58 according to one embodiment of the present invention. The structure 64 is oriented generally about longitudinal axis 65 and aligned with the vacuum interrupter 52. The left-hand half of FIG. 4 shows the structure 64 as it would appear when the vacuum interrupter 52 is in an open position, in the absence of an arcing fault detection signal 34. The right-hand half of FIG. 4 shows the structure 64 as it would appear when the vacuum interrupter 52 is in a closed position, after having shorted or "crow-barred" the source bus 22 to ground in response to receipt of an arcing fault detection signal 34.

The structure 64 consists generally of a latching mechanism 66, a driving mechanism 68 and a triggering mechanism 70. The latching mechanism 66 includes a latch core 72, a latch support 74 and a plurality of ball bearings 76 disposed between the latch core 72 and the latch support 74. A piston 78 is positioned between the latching mechanism 66 and the connecting rod 62. Generally, the driving mechanism 68, latch core 72, ball bearings 76 and piston 78 are adapted for rapid upward movement along longitudinal axis 65 when the vacuum interrupter 52 is actuated by the triggering mechanism 70, as will be described in detail hereinafter, to drive the movable contact 56 into engagement with the stationary contact 58.

The outward-facing surface of the latch core 72 includes a holding surface 80, an inclined surface 82 and a recessed surface 84. The inward-facing surface of the latch support 74 includes a retaining groove 86. The ball bearings 76 are adapted to move in both longitudinal and transverse directions relative to the latch core 72 and latch support 74, depending on the operational status of the latching mechanism 66. In the left-hand side of FIG. 4, the latching mechanism 66 is shown in a latched position, in which the ball bearings 76 are held between the retaining groove 86 of the latch support 74 and the holding surface 80 of the latch core 72. In this position, the piston 78 (and hence connecting rod 62 and movable contact 56) is restrained from longitudinal movement, maintaining the vacuum interrupter 52 in the open position.

In the right-hand side of FIG. 4, the latching mechanism 66 is shown in an unlatched position, in which the piston 78 (and hence movable contact 56) is released and permitted to move along longitudinal axis 65 toward the stationary contact 58. The release of the latching mechanism 66, e.g., from the latched position to the unlatched position, occurs in response to upward movement of the latch core 72. More specifically, when the latch core 72 is moved upwardly along the longitudinal axis 65, the holding surface 80 of the latch core 72 is advanced beyond the longitudinal position of the ball bearings 76, causing the ball bearings 76 to collapse inwardly toward the recessed surface 84 of the latch core 72. The inward movement of the ball bearings 76 causes them to become released from the retaining groove 86 of latch support 74, thereby "unlatching" the latching mechanism and permitting the vacuum interrupter 52 to move toward its closed position.

The driving mechanism 68 is a cylindrical disk oriented about the longitudinal axis 65 and adjacent to a bottom surface of the latch core 72. In one embodiment, the driving mechanism 68 comprises a metal disk, but it will be appreciated that other materials may be employed. The driving mechanism 68 is adapted for rapid upward movement along the longitudinal axis 65, in response to production of an accelerating force by the triggering mechanism 70. The driving mechanism 68, in conjunction with triggering mechanism 70, must accordingly be capable of developing significant velocities over a short distance. For example, in one embodiment, it is expected that the closing of vacuum interrupter 52 will be accomplished in two to four milliseconds. Assuming a travel distance of about 6 to about 10 mm, (corresponding to a typical distance between movable and stationary contacts 56, 58, when in the open position, in a vacuum interrupter 52 of the type shown in FIG. 3), the driving mechanism 68 must be capable of producing an average velocity of about 4 to 5 meters per second. However, it will be appreciated that this operating speed is exemplary only. The operating speed required for any particular application is dependent on the distance between contacts as well as the pressure and type of insulating medium (if any) between contacts.

In the left-hand side of FIG. 4, the driving mechanism 68 is shown adjacent to the triggering mechanism 70, as it would appear when the vacuum interrupter 52 is open. In the right-hand side of FIG. 4, the driving mechanism is shown as it would appear when the vacuum interrupter 52 is closed, having traveled a distance corresponding to the separation distance of the movable and stationary contacts 56, 58. The upward movement of the driving mechanism 68 causes corresponding movement of latch core 72, causing a release of latching mechanism 66 and ultimately closing the vacuum interrupter 52. As stated previously, closing of the vacuum interrupter 52 quickly extinguishes any arcing fault currents present in the distribution system, by rapidly shorting or "crow-barring" the source bus 22 to ground (or, to another phase, in an ungrounded system).

In one embodiment, the triggering mechanism 70 comprises a flat (pancake-type) radially wound coil having a face located adjacent to the driving mechanism 68. Generally, the coil 70 is connected to an energy source (not shown) which is activated in response to production of an arcing fault detection signal by the protection system. In one embodiment, the energy source comprises one or more capacitors (not shown) charged to a voltage in the range of hundreds or thousands of volts, depending on the particular application or rating of the vacuum interrupter 52. In one example, a 700 microfarad capacitor may be charged to 800 volts; where the gap between the open contacts 56, 58 is from about 6 to about 8 millimeters. Upon generation of an arcing fault detection signal, energy from the energy source is released into the coil 70, causing an electrical current to be conducted in the coil 70. The presence of electrical current in the coil 70 causes a repulsion force to be produced which is proportional to the number of turns of the coil 70 and the current carried by the coil 70. The repulsion force is directed along the longitudinal axis 65 toward the driving mechanism 68, imparting a high instantaneous acceleration to the driving mechanism 68 and causing a quick release of the latching mechanism 66, in the manner heretofore described. The accelerating force may be supplemented by an additional force associated with the mechanical switch. For example, the supplemental force may be provided by a compressed spring (not shown), or by pneumatic or hydraulic operation.

In one embodiment, the movable components of the mechanical switch of FIGS. 3 and 4 are relatively low mass components so as to minimize the amount of energy required to close the contacts 56, 58.

Now turning to FIGS. 5a through 5d, there is shown a series of solid-state switches which may be used in the system of FIG. 1. Components common to the various switch embodiments will be designated by common reference numerals throughout, although the different switch embodiments shown in FIGS. 5a through 5d will be designated by different reference numerals. Generally, each of the respective solid state switch embodiments of FIGS. 5a–d includes a pair of thyristors 90, 92 connected in parallel but in opposite polarity between the source bus 22 and ground of an electrical distribution system, so as to handle both positive- and negative-going portions of the AC power on the bus 22. In operation, each of the thyristors 90, 92 illustrated diagrammatically in FIGS. 5a–d. may comprise a number of thyristors coupled in series and parallel arrays to meet the voltage and current handling requirements of the system. Gate terminals of thyristors 90, 92, designated respectively by reference numerals 94 and 96, are connected to the AND gate 40 (or, alternatively, directly to the arcing fault sensors 20 and/or 28) to receive an arcing fault detection signal 34 upon the detection of an arcing fault by the protection system.

Generally, with no arcing fault signal 34 provided to the gate terminals 94, 96 (e.g., with no arcing fault having been detected), the thyristors 90, 92 are "off" and do not permit current to flow through the thyristor. With an arcing fault signal 34 applied to the gate terminals 94, 96, the thyristor is turned "on" and current is permitted to flow through the thyristor, thereby effectively short-circuiting the source bus 22 and extinguishing any arcing fault currents present in the system. Once the thyristors 90, 92 begin to conduct electrical current in response to application of the gate signal, the current flow through the thyristors 90, 92 does not generally shut off, even if the gate signal is removed, until the current flow is reduced below a threshold level, most likely by the main breaker 18 (FIG. 1) in the distribution system. It will be appreciated, however, that the present invention is not limited to the use of thyristors, but may utilize other forms of solid-state devices such as, for example, insulated-gate bipolar transistors (IGBTs). A system employing IGBTs will operate generally the same as a system employing thyristors, the difference being that current flow through an IGBT is blocked when the gate signal is removed.

Figure 5A:
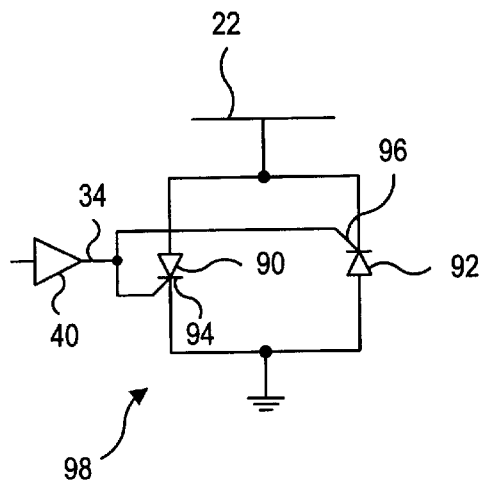
FIGS. 5a through 5d are schematic diagrams of solid-state switches which may form part of the arc diverter in the system of FIG. 1.

FIG. 5a illustrates a solid-state switch 98 in a basic embodiment including a pair of thyristors 90, 92 connected in parallel between the source bus 22 and ground, as heretofore described. With no arcing fault signal 34 provided to the gate terminals 94,96 (e.g., with no arcing fault having been detected), the thyristors 90, 92 do not permit current to flow through the thyristor. With an arcing fault signal 34 applied to the gate terminals 94, 96, the thyristors conduct electric current from the source bus 22 to ground, thereby short-circuiting the source bus 22 and extinguishing any arcing fault currents present in the system. The thyristors 90, 92 are biased in a manner such that the first thyristor 90 begins conducting current from the source bus to ground coincident to a positive half-cyle of alternating electric current on the source bus 22, and the second thyristor 92 begins conducting current from the source bus to ground coincident to a negative half-cyle of alternating electric current on the source bus 22.

Figure 5B:
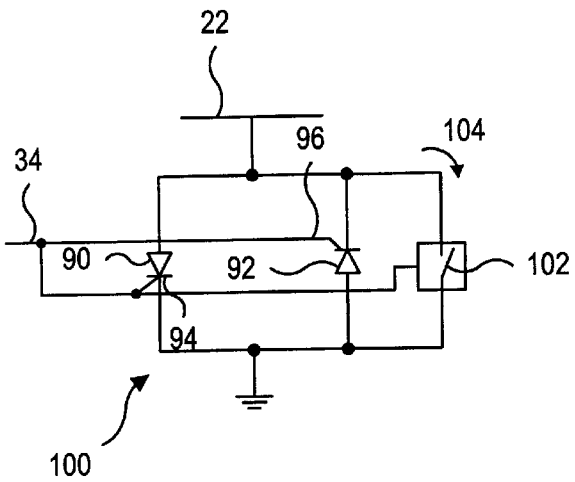

FIG. 5b illustrates a solid-state switch 100 according to an alternative embodiment of the present invention. The solid-state switch 100 includes respective thyristors 90, 92 having respective gate terminals 94,96 responsive to an arcing fault detection signal, as heretofore described. The solid-state switch 100 further includes a shunt shorting contact 102 connected between the source bus 22 and ground. The shunt shorting contact 102 generally comprises a relatively slow operating switch (e.g., about one-half cycle—16 m sec.) which is also triggered in response to the detection of an arcing fault (e.g., upon receipt of the arcing fault detection signal 34) to provide an alternate current path 104 from the source bus 22 to ground. In one embodiment, the shunt shorting contact 102 is triggered to provide the alternate conducting path 104 before the thyristors 90, 92 have conducted for much more than about one half-cyle of alternating electric current. This is an advantageous feature because typical thyristors are rated to withstand high currents for no more than about one half-cycle. The provision of shunt shorting contact 102 prolongs the operable life of the thyristors 90, 92 because it decreases the likelihood that the high current rating of the thyristors 90, 92 will be exceeded.

Figure 5C:
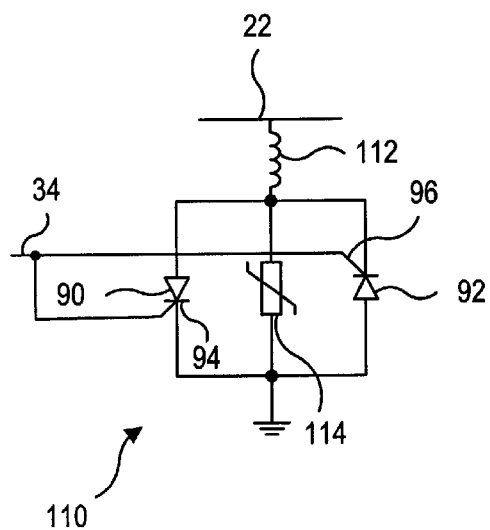

FIG. 5c illustrates a solid-state switch 110 according to another alternative embodiment of the present invention. The solid-state switch 110 includes respective thyristors 90, 92 having respective gate terminals 94,96 responsive to an arcing fault detection signal, as heretofore described. To protect the thyristors 90, 92 from excess voltages and/or currents, the solid-state switch 110 further includes a current-limiting reactance 112 and a voltage arrestor 114 such as a varistor. The current limiting reactance 112 is connected between the source bus 22 and the thyristors 90, 92 so that, when the thyristors 90, 92 are conducting, the current flowing through the respective thyristors 90, 92 is limited, preferably to a level that does not exceed the current rating of the thyristors 90, 92. Similarly, the voltage arrestor 114, such as a metal oxide varistor (MOV), is connected in parallel to the thyristors 90, 92 and is selected to clamp the voltage across thyristors 90, 92 to a level that does not exceed the rated breakdown voltage of the thyristors 90, 92.

Figure 5D:
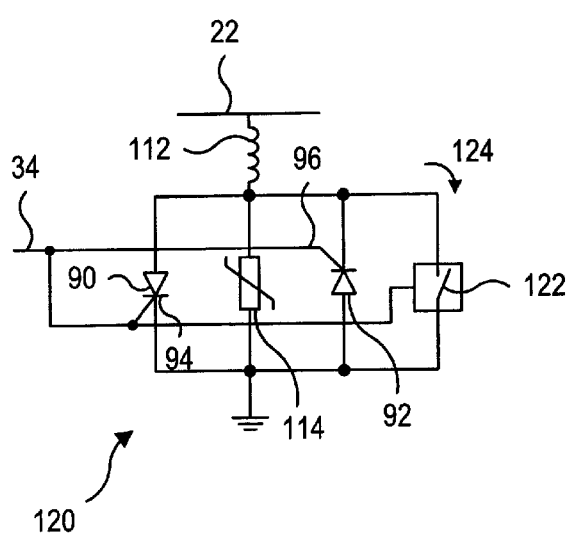

FIG. 5d illustrates a solid-state switch 120 according to still another alternative embodiment of the present invention. The solid-state switch 120 includes all of the components of the solid-state switch 110 shown in FIG. 5c, with the addition of a shunt shorting contact 122. The shunt shorting contact 122 serves substantially the same function as the shunt shorting contact 102 described in relation to FIG. 5b, providing an alternate conducting path 124 for the current flowing between the source bus 22 and ground. Preferably, the shunt shorting contact 122 is triggered to provide the alternate conducting path 124 before the thyristors 90, 92 have conducted for more than about one half-cyle of alternating electric current, for the reasons heretofore described in relation to FIG. 5b.

Figure 7:
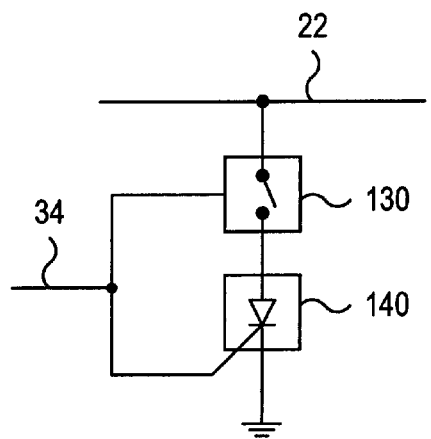
FIG. 7 illustrates a hybrid mechanical/solid state switch.

It will be appreciated that any of the solid-state switches described in relation to FIGS. 5a through 5d may be used in combination with a mechanical switch, such as that described in relation to FIGS. 3 and 4, to define a hybrid solid-state and mechanical arc diverter circuit 32 in the system of FIG. 1. One example of this is shown in FIG. 7 and described below.

Referring now to FIG. 6, there is shown an additional circuit which may be added in series between either the mechanical switch shown on FIGS. 3 and 4 or any of the solid state switches shown on FIGS. 5a–d and ground, or another phase line, in an ungrounded three phase system. This additional circuit component comprises the combination of a resistor 125 and a fuse 126 connected in parallel. In FIG. 6, two such circuits are illustrated for a three-phase system, that is between each of the A and C Phase Lines and the B Phase Line.

This circuit will prevent a sudden short circuit condition from occurring in the protected line when the switch initially closes. The fuse 126 will be a relatively fast acting fuse, for example, on the order of ¼ to ½ milliseconds, and may be rated from 10 to 250 amps, for example 30 amps. Taking into account stray inductance in the circuitry and wiring, it might be expected that about one millisecond will elapse before the current is totally transferred from the fuse 126 to resistor 125, following the opening of the fuse. However, since a typical arcing event lasts from 10 to 100 microseconds before the arcing space de-ionizes the ¼ to ½ millisecond provided by the fuse is long enough to accommodate the arcing condition, and yet short enough to prevent significant overcurrent from flowing through the protected circuit.

When the fuse opens, the resistor will provide an additional resistance in series to limit the current in the circuit, while still clamping the circuit to ground. The resistor value may be selected to limit the current to the circuit on the order of no more then about 2 to 2 ½ times the continuous current rating of the circuit. For example, in a 1200 amp continuous rated circuit, the resistor might be selected to permit a current flow of about 3 K amps. The use of a fuse will avoid the delay which might be experienced with the addition of the resistance alone, that is the time in which it might otherwise take the arc voltage to rise sufficiently to drive significant current through the resistor.

Referring briefly to FIG. 7, a simplified diagrammatic showing of a hybrid mechanical and electronic switch is illustrated. The mechanical switch 130 may be of similar design to the switch shown on FIGS. 3 and 4, while the electronic switch 140 may be of similar design to the electronic switches shown on FIGS. 5a through 5d. In this embodiment, the mechanical switch 130 and electronic switch 140 are wired in series between the buss 22 or other line to be protected and ground, or, in an ungrounded three-phase system between the protected phase and another phase. The same triggering line 34, carries the arcing fault detection signal. However, a delay (not shown) is employed to delay the triggering of the solid state switch 140 until the mechanical switch 130 closes. Therefore, the mechanical switch closes before the flow of current is initiated to eliminate the phenomenon known as non-disruptive discharge which may occur in vacuum interrupters, and to otherwise eliminate the problems such as contact welding or the like which may occur when the contacts of a mechanical switch are closed while a relatively high current is flowing. At the same time, the solid state device 140 will not be required to withstand the voltage on the line 22. This arrangement, therefore, permits the use of fewer solid state devices to form the solid state switch 140 since the voltage withstand capacity is greatly reduced, and also permits the use of a smaller and more economical mechanical switch 130. The gap between the contacts and the mechanical switch 130 in the embodiment of FIG. 7 may be smaller than that described above, for example, about 4 millimeters rather than about 8 millimeters, such that a smaller, less expensive component may be utilized. The circuit of FIG. 6 may also be used in series with the hybrid switch of FIG. 7.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An arcing fault protection system for a switchgear enclosure accommodating a plurality of feeder circuits, each of said feeder circuits being electrically connected to a source bus and carrying an electric current through said switchgear enclosure toward one or more loads downstream of said switchgear enclosure, said source bus being connected to a power source through a main circuit, said switchgear enclosure including a plurality of compartments for housing electrical components associated with said feeder circuits, said arcing fault protection system comprising:

a current sensor for monitoring said main circuit for the presence of arcing fault currents;

a plurality of optical sensors for monitoring said feeder circuits for the presence of arcing fault currents;

means for producing an arcing fault detection signal in response to said current sensor detecting said arcing fault currents in said main circuit and at least one of said optical sensors detecting said arcing fault currents in an associated one of said feeder circuits; and a grounding device for rapidly grounding said source bus in response to the production of an arcing fault detection signal by said protection system, the grounding of said source bus diverting current carried on said source bus to ground and rapidly eliminating arcing fault currents occurring on any of said feeder circuits; wherein said grounding device comprises to switching means for operating in less than about 4 milliseconds following the occurrence of an arcing fault.

2. The protection system of claim 1 wherein said switching means comprises a mechanical switch rapidly movable from an open position to a closed position.

3. The protection system of claim 2 wherein said mechanical switch comprises a stationary contact and a low mass movable contact, and a fast-acting driving mechanism for rapidly moving said movable contact to a closed position relative to said stationary contact.

4. The protection of claim 3 wherein said stationary contact and said movable contact are part of a vacuum interrupter.

5. The protection system of claim 2 wherein said mechanical switch comprises:

a movable contact and a stationary contact, one of said movable and stationary contacts being electrically connected to said source bus, the other of said movable and stationary contacts being electrically connected to ground, said movable contact being movable from a first longitudinal position apart from said stationary contact and defining said open position of said mechanical switch to a second longitudinal position electrically connected to said stationary contact an d defining said closed position of said mechanical switch;

a latching mechanism movable between a latched position and an unlatched position, said latching mechanism holding said movable contact i n said first longitudinal position when in said latched position, said latching mechanism releasing said movable contact from said first longitudinal position when in said unlatched position;

a driving mechanism adapted for rapid movement in a longitudinal direction, wherein said rapid movement of said driving mechanism drives said latching mechanism from said latched position to said unlatched position and accelerates said movable contact toward said second longitudinal position; and a triggering mechanism for triggering said movement of said driving mechanism in response to said arcing fault detection signal.

6. The protection system of claim 5 wherein said movable an d stationary contacts are housed within a cylindrical enclosure including a fluid medium.

7. The protection system of claim 5 wherein a gap of from about 6 mm to about 10 mm is defined between said movable contact and said stationary contact when said mechanical switch is in the open position.

8. The protection system of claim 5 wherein said triggering mechanism comprises a radially wound coil adjacent to said driving mechanism, said coil being connected to an energy source and adapted to conduct an electric current in response to activation of said energy source, said coil producing an accelerating force to propel movement of said driving mechanism in response to conducting said electric current.

9. The protection system of claim 5 wherein said driving mechanism comprises a repulsion disk oriented about a longitudinal axis, said repulsion disk rapidly advancing along said longitudinal axis and communicating movement of said movable contact toward said stationary contact in response to production of said accelerating force by said triggering mechanism.

10. The protection system of claim 9 wherein said latching mechanism comprises:

a latch core oriented about said longitudinal axis and adjacent to said repulsion disk, said latch core being movable coincident to said repulsion disk along said longitudinal axis and communicating movement to said movable contact in response to production of said accelerating force by said triggering mechanism, said latch core having an outer surface defining a holding surface and a recessed releasing surface;

a latch support oriented transverse to said latch core and having an inner surface defining a retaining member;

a plurality of ball bearings disposed between said latch core and said latch support, said ball bearings being held into engagement with said retaining member by said holding surface when said latching mechanism is in said latched position, said ball bearings collapsing inwardly toward said releasing surface and becoming released from said retaining member when said latching mechanism is in said unlatched position.

11. The protection system of claim 2 wherein said switching means further comprises a semiconductor switching device coupled in series with said mechanical switch and with a ground circuit and having a control terminal coupled to receive to said arcing fault detection signal with a predetermined time delay.

12. The protection system of claim 1 wherein said switching means comprises a first semiconductor device and a second semiconductor device, each of said first and second semiconductor devices including a control terminal coupled to receive said arcing fault detection signal, each of said first and second semiconductor devices diverting current from said source bus when said arcing fault detection signal is applied to its control terminal.

13. The protection system of claim 12 wherein said first device diverts current from said source bus upon application of said arcing fault detection signal to its control terminal coincident to a positive half-cycle of alternating electric current on said source bus, and wherein said second semiconductor device diverts current flow from said source bus upon application of said arcing fault detection signal to its control terminal coincident to a negative half-cycle of alternating electric current on said source bus.

14. The protection system of claim 12 further comprising a shunt shorting contact connected across the first and second semiconductor devices, said shunt shorting contact being triggered by said arcing fault detection signal to provide an alternate current path for diverting current from said source bus.

15. The protection system of claim 12 wherein said switching means further includes a current limiting reactance connected between said source bus and said first and second semiconductor devices.

16. The protection system of claim 15 further comprising a shunt shorting contact connected across said semiconductor devices, said shunt shorting contact being triggered by said arcing fault by said detection signal to provide an alternate current path for diverting current.

17. The protection system of claim 12 further comprising a voltage arrestor connected across said semiconductor devices to protect said semiconductor devices from damage due to overvoltages.

18. The protection system of claim 1 and further including a resistor and a fuse coupled together in a parallel circuit, and said parallel circuit being coupled in series with said switching means.

* * * * *